United States Patent
Peng et al.

(10) Patent No.: US 10,332,260 B2
(45) Date of Patent: Jun. 25, 2019

(54) IDENTIFICATION OF A CONTACT POINT BETWEEN A PANTOGRAPH AND A POWER SUPPLY LINE IN AN IMAGE

(71) Applicant: DTI Group Limited, Western Australia (AU)

(72) Inventors: En Peng, Western Australia (AU); William Hock Oon Lau, Western Australia (AU); Brett Adams, Western Australia (AU)

(73) Assignee: DTI GROUP LIMITED, Western Australia (AU)

( * ) Notice: Subject to any disclaimer, the term of this patent is extended or adjusted under 35 U.S.C. 154(b) by 97 days.

(21) Appl. No.: 15/511,262

(22) PCT Filed: Sep. 15, 2015

(86) PCT No.: PCT/AU2015/050548
§ 371 (c)(1),
(2) Date: Mar. 15, 2017

(87) PCT Pub. No.: WO2016/041009
PCT Pub. Date: Mar. 24, 2016

(65) Prior Publication Data
US 2017/0243357 A1    Aug. 24, 2017

(30) Foreign Application Priority Data
Sep. 15, 2014    (AU) .................................. 2014903665

(51) Int. Cl.
*B60M 1/28* (2006.01)
*G06T 7/13* (2017.01)
*B60L 3/12* (2006.01)

(52) U.S. Cl.
CPC ...... *G06T 7/13* (2017.01); *B60L 3/12* (2013.01); *B60M 1/28* (2013.01); *B60L 2200/26* (2013.01);
(Continued)

(58) Field of Classification Search
CPC ......... B60L 2200/26; B60L 3/12; B60M 1/28; G06T 2207/20164; G06T 2207/30248; G06T 7/13
See application file for complete search history.

(56) References Cited

FOREIGN PATENT DOCUMENTS

| JP | 2002-139305 A | 5/2002 |
|---|---|---|
| JP | 2009-040215 A | 2/2009 |

OTHER PUBLICATIONS

International Search Report and Written Opinion for PCT/AU2015/050548 dated Nov. 2, 2015.
(Continued)

*Primary Examiner* — Siamak Harandi
(74) *Attorney, Agent, or Firm* — Pearne & Gordon LLP (57) ABSTRACT

Computer-implemented methods, software, and computer systems for identifying a contact point between a pantograph of an electric vehicle and a power supply line represented in an image. The method includes, based on edges represented in the image, determining a first intersection point P1 and a second intersection point P2 that are sufficiently separated. The first intersection point P1 is formed by an intersection of a first edge Line with a top edge of the pantograph, and the second intersection point P2 is formed by an intersection of a second edge with the top edge of the pantograph. Then determining a first slope associated with the first edge, and a second slope associated with the second edge. Further, identifying the first intersection point P1 or the second
(Continued)

intersection point P2 as the contact point between the pantograph and the power supply line by comparing the first slope and the second slope.

15 Claims, 6 Drawing Sheets

(52) U.S. Cl.
CPC .............. *G06T 2207/20164* (2013.01); *G06T 2207/30248* (2013.01)

(56) References Cited

OTHER PUBLICATIONS

Written Opinion for PCT/AU2015/050548 dated Nov. 2, 2015.
Landi, A. et al., 'Hough transform and thermo-vision for monitoring pantographcatenary system', Proceedings of the Institution of Mechanical Engineers, Part F: Journal of Rail and Rapid Transit 220.4 (Dec. 2006): 435-447.

IDENTIFICATION OF A CONTACT POINT BETWEEN A PANTOGRAPH AND A POWER SUPPLY LINE IN AN IMAGE

CROSS-REFERENCE TO RELATED APPLICATIONS

The present application claims priority from Australian Provisional Patent Application No 2014903665 filed on 15 Sep. 2014, the content of which is incorporated herein by reference.

TECHNICAL FIELD

The present disclosure generally relates to contact point identification methods and devices. The present disclosure includes computer-implemented methods, software, and computer systems for identifying a contact point between a pantograph and a power supply line represented in an image.

BACKGROUND

An electric vehicle, for example, an electric train, may have a pantograph installed on the top of the vehicle to contact a power supply line positioned over the electric vehicle. The pantograph introduces electric power from the power supply line to drive the electric vehicle. Sparks may occur around a contact point between the pantograph and the power supply line when the vehicle is traveling. These sparks may be due to the contact between the pantograph and the power supply line not being smooth.

The unsmooth contact indicates either the pantograph or the power supply line may have been damaged over time. It is undesirable to operate the electric vehicle with the damaged pantograph or the power supply line as accidents involving the electric vehicle may occur. Therefore, the pantograph may be monitored by a camera capturing images of the pantograph when the electric vehicle is in operation.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present disclosure is not to be taken as an admission that any or all of these matters form part of the prior art base or were common general knowledge in the field relevant to the present disclosure as it existed before the priority date of each claim of this application.

SUMMARY

There is provided a computer-implemented method for determining a contact point between a pantograph and a power supply line represented in an image, the method comprising:

based on edges represented in the image, determining a first intersection point and a second intersection point that are sufficiently separated, wherein the first intersection point is formed by an intersection of a first edge and a top edge of the pantograph, and the second intersection point is formed by an intersection of a second edge and the top edge of the pantograph;

determining a first slope associated with the first edge, and a second slope associated with the second edge; and identifying one of the first intersection point or the second intersection point as the contact point between the pantograph and the power supply line by comparing the first slope and the second slope.

It is an advantage of the invention that the contact point between the pantograph and the power supply line may be identified fast and accurately.

The computer-implemented method may further comprise storing an indication in a memory of the contact point.

The computer-implemented method may further comprise determining the top edge of the pantograph from the edges represented in the image.

Determining the first intersection point may comprise:

determining a first plurality of intersection points formed by intersections of a first plurality of edges with the top edge of the pantograph, the first plurality of intersection points being sufficiently close to each other; and selecting one of the first plurality of intersection points as the first intersection point.

The first plurality of edges may have an associated slope in a slope range.

Identifying one of the first intersection point and the second intersection point as the contact point may comprise:

if both the first slope associated with the first edge and the second slope associated with the second edge are positive values, determining the first intersection point to be the contact point if the first slope is less than the second slope; and determining the second intersection point to be the contact point if the second slope is less than the first slope.

Identifying one of the first intersection point and the second intersection point as the contact point may comprise:

if both the first slope associated with the first edge and the second slope associated with the second edge are negative values, determining the first intersection point to be the contact point if the first slope is greater than the second slope; and determining the second intersection point to be the contact point if the second slope is great than the first slope.

Identifying one of the first intersection point and the second intersection point as the contact point may comprise:

determining an absolute value of the first slope associated with the first edge, and an absolute value of the second slope associated with the second edge; and determining the first intersection point to be the contact point if the absolute value of the first slope is less than the absolute value of the second slope; and determining the second intersection point to be the contact point if the absolute value of the second slope is less than the absolute value of the first slope of the first edge.

The first plurality of edges may be located in a portion of the image that is above the top edge of the pantograph.

Determining the first slope associated the first edge may comprise:

determining a first line based on at least part of the first edge to represent the first edge; and determining a slope of the first line with reference to a coordinate system as the first slope.

There is provided a computer software program, including machine-readable instructions, when executed by a processor, causes the processor to perform the method describe above.

There is provided a computer system for determining a contact point between a pantograph and a power supply line represented in an image, the computer system comprising:

a memory to store instructions;

a processor to perform the instructions from the memory based on edges represented in the image, to determine a first intersection point and a second intersection point that are sufficiently separated, wherein the first intersection point is formed by intersection of a first edge and a top edge of the pantograph, and the second intersection point is formed by an intersection of a second edge and the top edge of the pantograph;

to determine a first slope associated with the first edge, and a second slope associated with the second edge; and to identify one of the first intersection point or the second intersection point as the contact point between the pantograph and the power supply line by comparing the first slope and the second slope.

BRIEF DESCRIPTION OF THE DRAWINGS

Features of the present disclosure are illustrated by way of non-limiting examples, and like numerals indicate like elements, in which.

BEST MODES OF THE INVENTION

Figure 1:
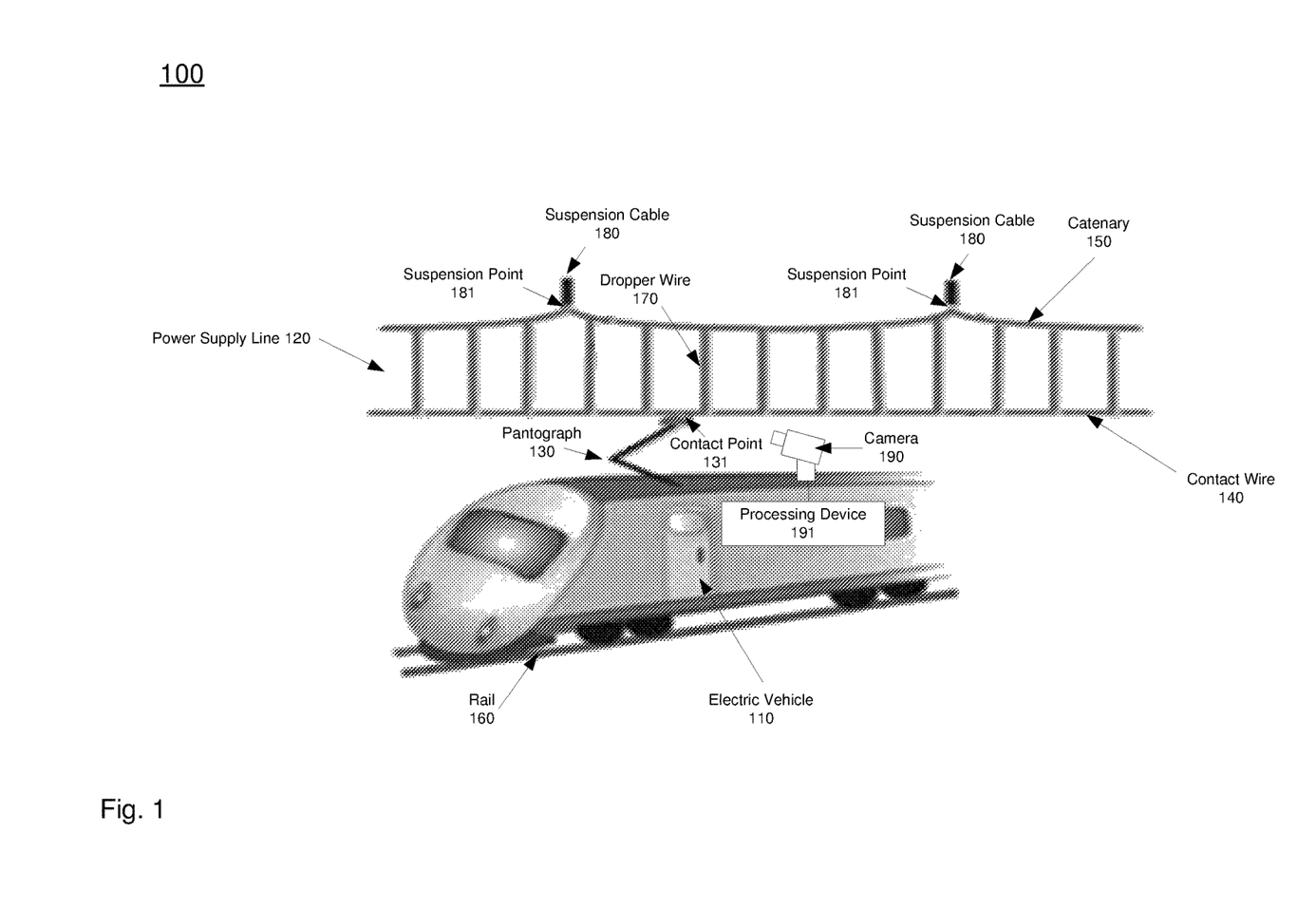
FIG. 1 is an diagram of an example vehicle system according to the present disclosure.

FIG. 1 is an diagram of an example vehicle system 100 according to the present disclosure. The vehicle system 100 comprises an electric vehicle 110 and a power supply line 120. The electric vehicle 110 comprises a pantograph 130. It should be noted that although only one car of the electric vehicle 110 is shown in FIG. 1, the electric vehicle 110 may comprise a plurality of cars.

The power supply line 120 is an overhead power line that is installed over the travel path of the electric vehicle 110. The power supply line 120 comprises a contact wire 140 and a catenary 150.

The contact wire 140 carries electric power and contacts the pantograph 130 of the electric vehicle 110, particularly, the carbon strip part at the top surface of the pantograph 130, at a contact point 131. The electric power carried on the contact wire 140 is introduced or collected to a driving mechanism of the electric vehicle 110, for example, an electric motor (not shown in FIG. 1), through the pantograph 130 to drive the electric vehicle 110 on rails 160. In other examples, the electric vehicle 110 may travel without use of the rails 160.

To keep the contact wire 140 within defined geometric limits, the catenary 150 is used to support the contact wire 140 from above through dropper wires 170. That is, the contact wire 140 is positioned lower than the catenary 150 in this example.

In FIG. 1, the dropper wires 170 vertically extend between the contact wire 140 and the catenary 150. The dropper wires 170 are attached to the contact wire 140 and the catenary 150 at specified intervals.

The power supply line 120 is hung over the electric vehicle 110 by suspension cables 180, which may be in turn secured to support mechanisms (not shown in FIG. 1), for example, support towers or support poles, which are installed along the travel path. In the example shown in FIG. 1, the suspension cables 180 are attached to the power supply line 120 at suspension points 181.

Figure 4A:
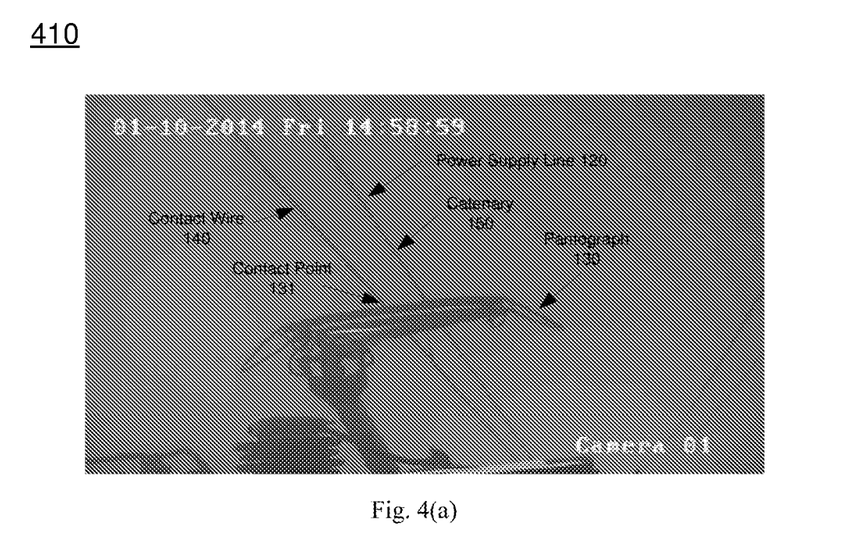
FIG. 4(a) is an example image of a pantograph that is captured by a camera.

A camera 190 is installed on the top of the electric vehicle 110 to monitor the pantograph 130. Specifically, the camera 190 may capture images of the pantograph 130 when the electric vehicle 110 is in operation. The images may be still images and may form part of a video. An example image 410 of the pantograph 130 captured by the camera 190 is shown in FIG. 4(a). The image 410 may be formed by points, which for example may be one or more pixels of digital images.

The images of the pantograph 130 captured by the camera 190 are sent to a processing device 191 for further analysis to determine operation conditions of the electric vehicle 110.

It should be noted that although the processing device 191 in FIG. 1 is located in the electric vehicle 110, the processing device 191 may also be located remotely from the electric vehicle 110, or both and each processing device 191 can perform part of the method of identifying the pantograph 130. Further, although the pantograph 130 and the camera 190 monitoring the pantograph 130 are installed on the same car of the electric vehicle 110, as shown in FIG. 1, the pantograph 130 and the camera 190 may also be installed on different cars of the electric vehicle 110.

Figure 2:
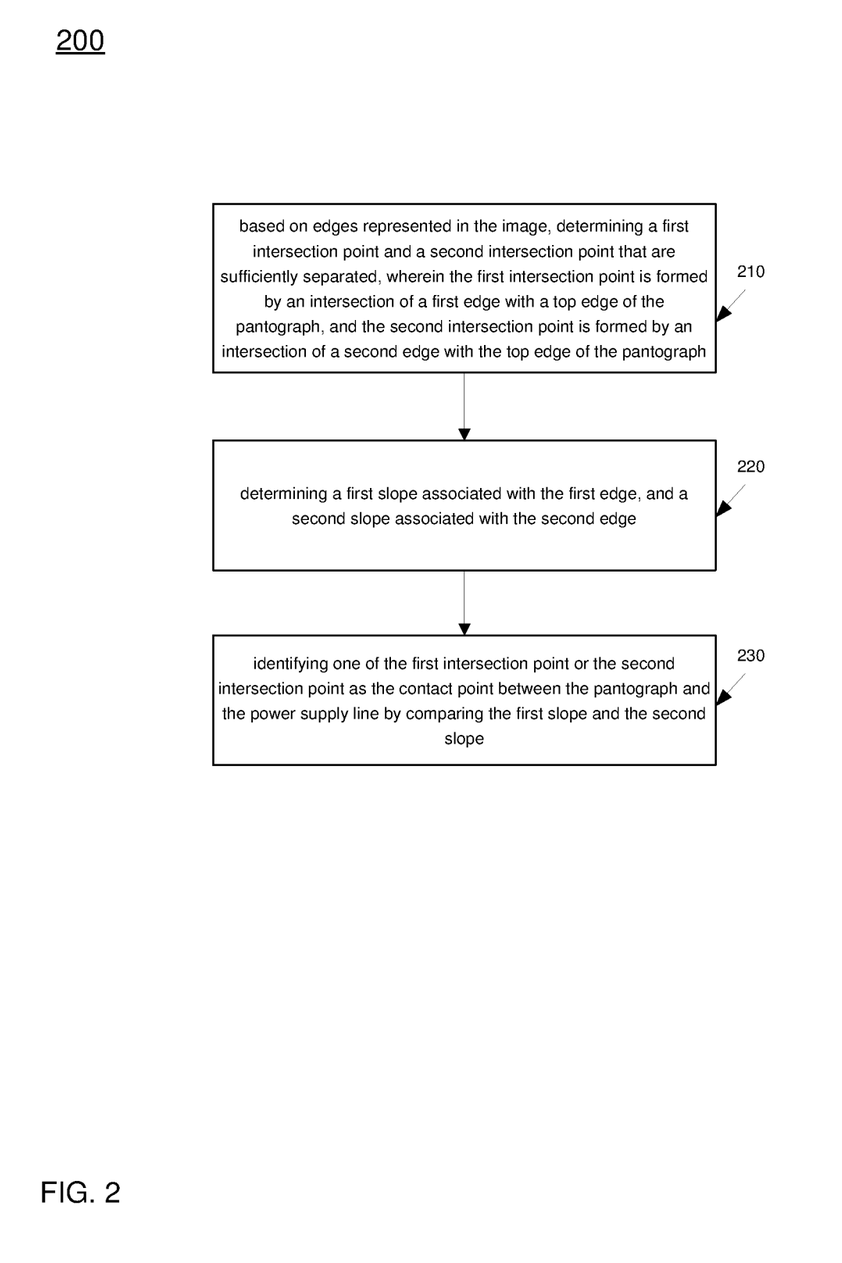
FIG. 2 shows an example method for identifying a contact point between a pantograph and a power supply line according to the present disclosure.

An example method 200 for identifying the contact point 131 between the pantograph 130 and the power supply line 120 represented in the image 410 is described with reference to FIG. 2.

Figure 4B:
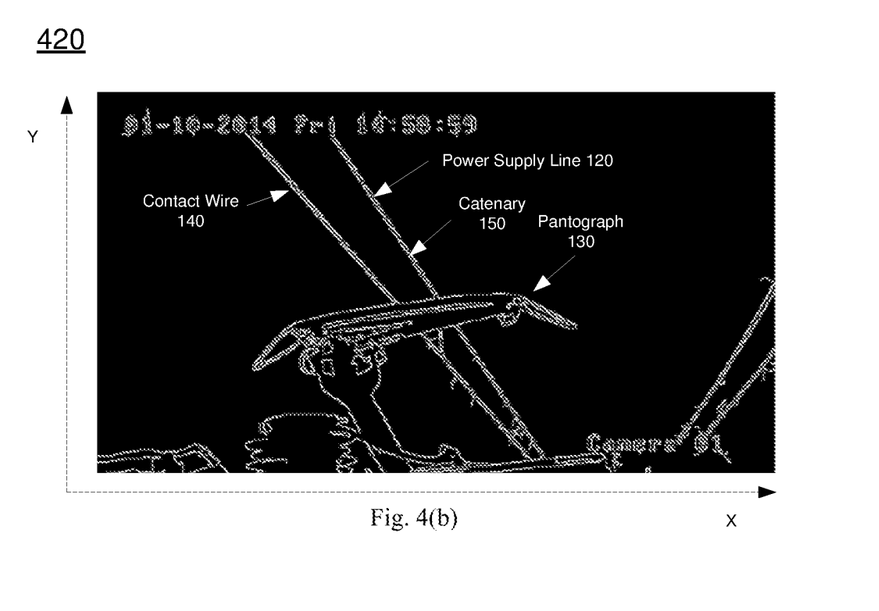
FIG. 4(b) is an example image representative of edges in FIG. 4(a)

Upon receipt of the image 410 from the camera 190, optionally, the processing device 191 extracts edges from the image 410. Specifically, the processing device 191 may use an edge detector for example a Canny edge detector, described in John Canny, "A Computational Approach to Edge Detection," IEEE Transactions on Pattern Analysis and Machine Intelligence, vol. 8, no. 6, pp. 679-698, June 1986, doi:10.1109/TPAMI.1986.4767851, to extract the edges from the image 410. The edges extracted by the edge detector may have single point or pixel width. As a result, an image 420 is generated that is representative of the edges in the image 410, as shown in FIG. 4(b). Alternatively, the image received may already include a representation of the edges in the image and the above edge extracting step is not performed accordingly.

It can be seen from the image 420 that an edge that is particularly relevant to identification of the contact point 131 is comprised of points that are substantially located in a line. A relevant edge may include the top edge of the pantograph 130, representing the top surface of the pantograph 130. A relevant edge may also include the edges of the power supply line 120, for example, the edges of the contact wire 140 and the centenary 150. A line that represents an edge may be determined based on at least part of the points or pixels that the edge is comprised of. The line may also represent a plurality of edges that are substantially located on the line.

In the present disclosure, the degree of incline of the edge may be represented by determining the slope of the line representing the edge with reference to a coordinate system, indicated by X and Y axes in FIG. 4(b). And the slope of the line is referred to as a slope associated with the edge. The coordinate system with reference to which the slope of the line is determined may also be a polar coordinate system or any other suitable coordinate system without departing from the scope of the present disclosure.

An edge in the image 420 may intersect with another edge to form an intersection point. It should be noted that, in the present disclosure, the intersection point between one edge and another edge may be represented by an intersection point between a line representing the edge and another line representing the other edge. The intersection point between one edge and another edge may also be represented by an intersection point between a line representing the edge and the other edge.

Although locations of the intersection points between one edge and another edge may be slightly different under different representations of the intersection point between the edge and the other one, the different locations of the intersection points do not depart from the scope of the present disclosure.

Based on the edges represented in the image 420, the processing device 191 may identify the pantograph 130 according to the methods described in the co-pending application, "Identification of a pantograph in an image", filed on the same day as this application and owned by the Applicant. As a result, an indication of the pantograph 130 is determined, such as that indicated by the dash box shown an image 430 in FIG. 4(c), referred to as a bounding box. In another example, the pantograph 130 may be identified in any other suitable way without departing from the scope of the present disclosure.

Figure 4C:
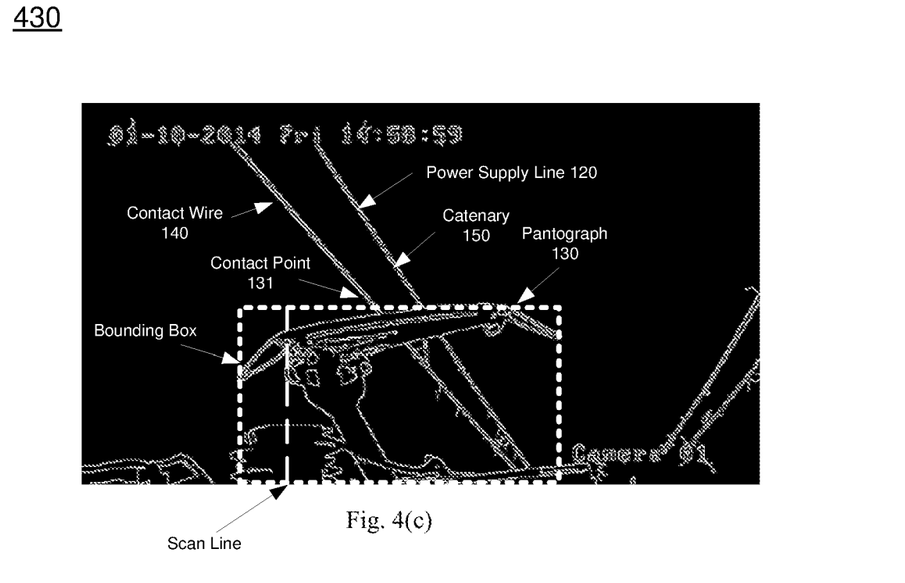
FIG. 4(c) is an example image illustrating identification of the pantograph represented in FIG. 4(b)

As can be seen from the bounding box shown in FIG. 4(c), the top edge of the pantograph 130 is the top-most edge within the bounding box, which is comprised of the top-most edge points in the bounding box.

To identify the top edge of the pantograph 130, the processing device 191 scans the portion of the image 420 within the bounding box along a vertical scan line, shown as the vertical dash line in the bounding box in FIG. 4(c), and identifies the top-most edge point within the bounding box on the scan line. The scanning may be performed from the top of the bounding box to the bottom of the bounding box or from the bottom of the bounding box to the top of the bounding box, or in any other manner without departing from the scope of the present disclosure.

The processing device 191 repeatedly performs the above process but along a different vertical scan line that is slightly offset from the previous scan line until all the top-most edge points are identified. For example, the next scan line may be one point offset from the previous one. This way, the processing device 191 may identify all the top-most edge points within the bounding box that form the top edge of the pantograph 130, as shown in an image 440 in FIG. 4(d).

Figure 4D:
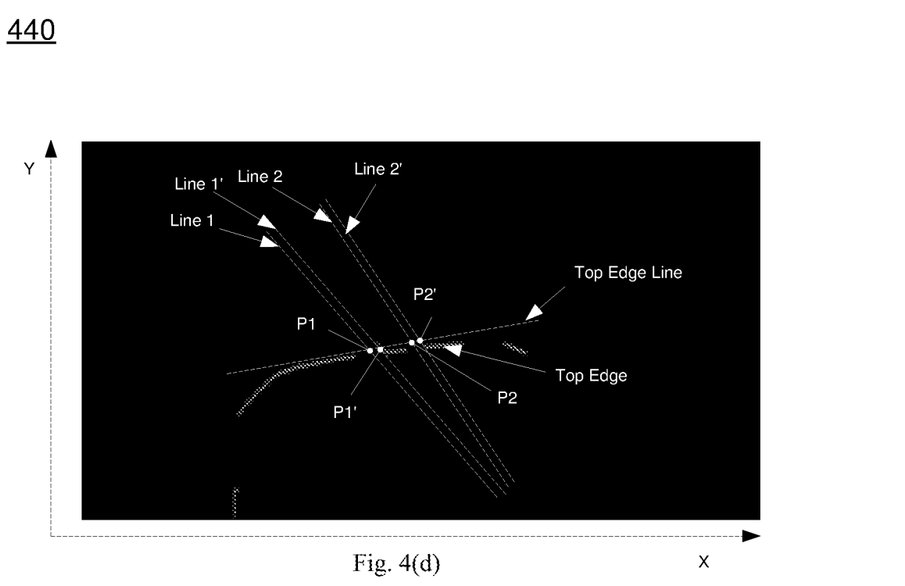
FIG. 4(d) is an example image illustrating identification of the contact point between the pantograph and the power supply line according to the present disclosure.

The top edge of the pantograph 130 may not be continuous due to intersection with the edges of the power supply line 120, which results in a plurality of edges, as shown in FIG. 4(d). The processing device 191 performs Hough transform on the edge points that form the top edge of the pantograph 130 to determine a line representing the top edge of the pantograph 130. The line is referred to as a top edge line of the pantograph 130, as shown in FIG. 4(d).

It should be noted that although Hough transform is applied in this example to determine lines representing the edges in the image 420, other line detection methods may also be used, for example, the multiple circle mask-based line detection method described in the co-pending application, "Arc detection system and method", filed on the same day as this application and owned by the Applicant.

The processing device 191 also performs Hough transform on the image 420 to determine lines representing the edges of the power supply line 120 including the contact wire 140 and the catenary 150. For example, the processing device 191 may determine lines 1, 1', 2 and 2' are the lines representing the edges of the power supply line 120.

In most cases, as shown in the image 430, the degree of incline of the edges of the power supply line 120 may be in an incline range. Particularly, the edges of the power supply line 120 may not be horizontal or vertical, but have an associated slope in a slope range, for example, between −45° and +45°. Therefore, Hough transform may be performed by the processing device 191 subject to the slope constrain to determine those lines that have a slope in the slope range, for example, between −45° to +45°. Further, the edges of the power supply line 120 may be substantially located in a portion of the image 420 above the pantograph 130. Therefore, Hough transform may be only performed on the portion of the image 420 above the top edge of the pantograph 130. This way, computing burden of the processing device 191 may be reduced and the process may take less time.

The processing device 191, based on edges represented in the image, particularly, based on the lines representing the edges of the power supply line 120, determines 210 a first intersection point between a first edge and the top edge of the pantograph 130, and a second intersection point between a second edge and the top edge of the pantograph 130.

The first intersection point and the second intersection point may be sufficiently separated to avoid a situation where both the first edge and the second edge are edges of the contact wire 140 or the catenary 150 at the same time. That is, one of the first edge and the second edge is an edge of the contact wire 140 and the other one is an edge of the catenary 150. Specifically, the first edge and the second edge is separated by a distance or a distance range (distance threshold) between the contact wire 140 and the catenary 150, which may be determined empirically and may be represented by a physical distance in real world or a distance measured in points in the image. This way, the first intersection point and the second intersection point determined as above are considered to be candidates for the contact point 131.

Figure 3:
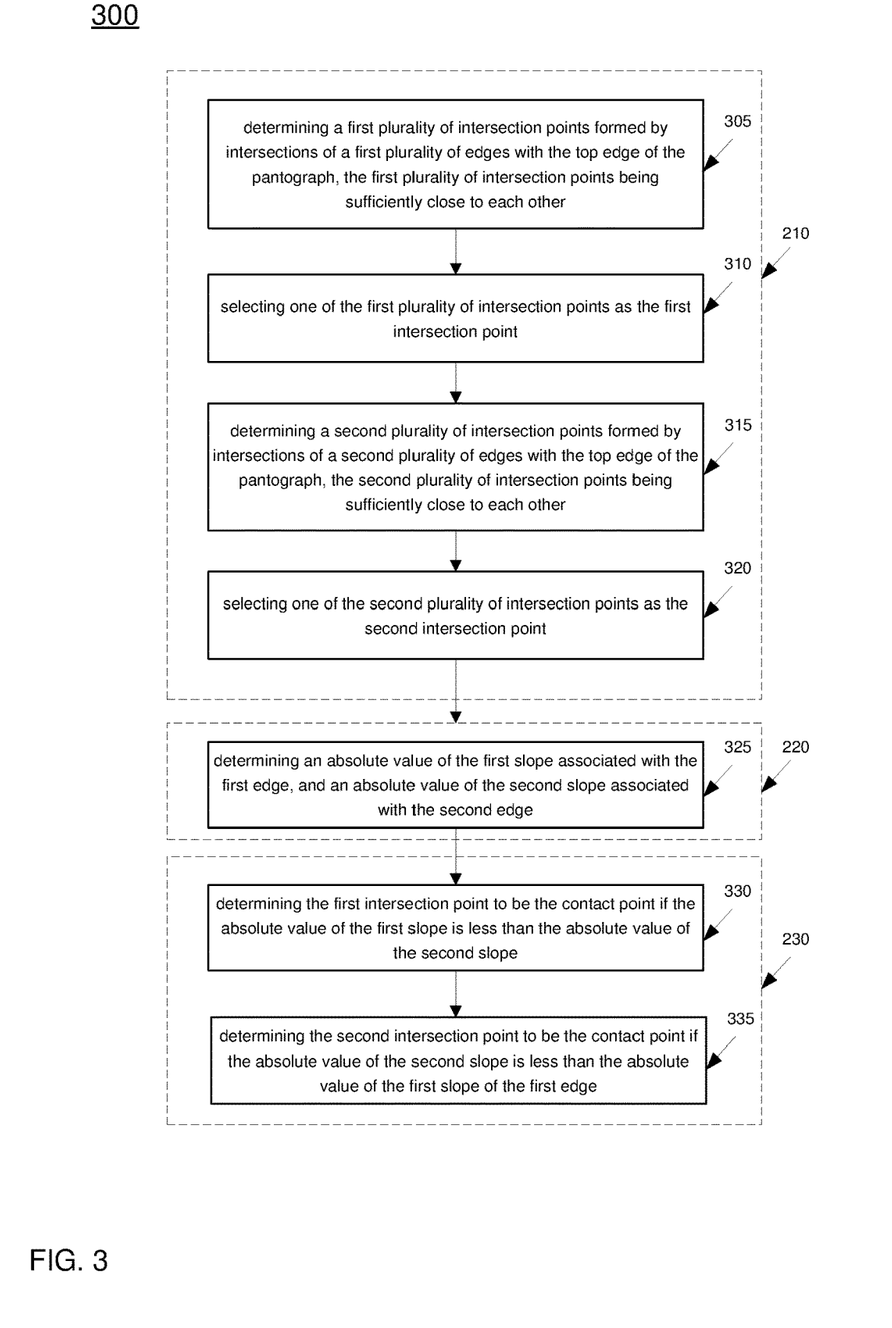
FIG. 3 shows an example method for identifying a contact point between a pantograph and a power supply line according to the present disclosure.

An example of determining the first intersection point and the second intersection point is described with reference to FIG. 3.

As can be seen from the image 420 in FIG. 4(b), the edges of the contact wire 140 may include a plurality of edges corresponding to the outline of the contact wire 140 in the lengthwise direction of the contact wire 140, and the catenary 150 may also include a plurality of edges corresponding to the outline of the catenary 150 in the lengthwise direction of the catenary 150. The processing device 191 determines lines 1, 1', 2 and 2' via Hough transform to represent these edges.

Accordingly, the processing device 191 may determine intersection points P1, P1', P2 and P2' between the lines 1, 1', 2, 2' and the top edge line of the pantograph 130, respectively, to represent intersection points between the edges of the power supply line 120 including the contact wire 140 and the catenary 150 and the tope edge of the pantograph 130, as shown in FIG. 4(d).

In another example, the intersection points P1, P1', P2 and P2' may be determined by tracking points in the image 420 without determining the lines 1, 1', 2 and 2' first.

As the contact wire 140 and the catenary 150 included in the power supply line 120 are usually thin and long objects in the captured image 410, the edges of the contact wire 140 or the catenary 150 in the lengthwise direction are close to each other. As a result, the intersection points between the edges of the contact wire 140 or the catenary 150 and the top edge of the pantograph 130 are sufficiently close to each other as well.

The distance between these intersection points may substantially depends on for example the width of the contact wire 140 or the catenary 150. Therefore, the width of the contact wire 140 or the catenary 150 may be used to identify these intersection points. For example, these intersection points should meet the requirement that the maximum distance between two intersection points in these intersection points is less than 200% of the width.

The processing device 191 determines 305 a first plurality of intersection points that are sufficiently close to each other from the intersection points P1, P1', P2 and P2' such that the first plurality of intersection points are the intersection points between one of the contact wire 140 and the catenary 150 and the top edge of the pantograph 130. For example, the first plurality of intersection points may be P1 and P1' that are sufficiently close to each other.

The processing device 191 selects 310 one of the intersection point P1 and P1' as the first intersection point.

Similarly, the processing device 191 determines 315 a second plurality of intersection points that are sufficiently close to each other from the intersection points P1, P1', P2 and P2' such that the second plurality of intersection points are the intersection points between another one of the contact wire 140 and the catenary 150 and the top edge of the pantograph 130. For example, the second plurality of intersection points may be P2 and P2' that are sufficiently close to each other.

It should be noted that the contact point 131 is where the contact wire 140 contacts the carbon strip part at the top surface of the pantograph 130, which is considered to be one of the intersection points between the edges of the contact wire 140 and the top edge of the pantograph 130 in the image 420.

In real world, the catenary 150 does not actually contact the pantograph 130 since the catenary 150 is higher than the contact wire 140. However, once edges are extracted from the image 410 and presented in the image 420, the edges of the catenary 150 may appear to intersect with the top edge of the pantograph 130.

To determine which one of the first intersection point and the second intersection point is the contact point 131, the processing device 191 needs to determine which one of the first edge and the second edge is an edge of the contact wire 140. Therefore, the processing device 191 determines 220 a first slope associated with the first edge, and a second slope associated with the second edge. As described above, the first edge intersects with the top edge of the pantograph 130 at the first intersection point, and the second edge intersects with the top edge of the pantograph 130 at the second intersection point. The first slope may be the slope of the line representing the first edge, and the second slope may be the slope of the line representing the second edge.

It can be seen from the image 420 in FIG. 4(b), degrees of incline of the edges of the contact wire 140 are substantially different from those of the edges of the catenary 150. Therefore, the processing device 191 compares the first slope and the second slope to determine which one of the first edge and the second edge representing an edge of the contact wire 140, and thus identifies 230 the intersection point between the one representing the contact wire 140 and the top edge of the pantograph 130 as the contact point 131.

The above process is specifically described with reference to FIG. 3.

As described above, the processing device 191 selects the intersection point P1 as the first intersection point, and the intersection point P2 as the second intersection point.

The intersection point P1 is formed by the line 1 representing an edge of the power supply line 120 intersecting with the top edge line of the pantograph 130, and the intersection point P2 is formed by the line 2 representing another edge of the power supply line 120 intersecting with the top edge line of the pantograph 130.

The processing device 191 determines the slope of the line 1 as the first slope, and the slope of the line 2 as the second slope.

Depending on the angle of the camera 190 relative to the power supply line 120, the slope of the line 1 and the slope of the line 2 may be positive values or negative values.

It can be seen from FIG. 4(d) that the line representing an edge of the contact wire 140 has a smaller degree of incline with reference to the coordinate system than the line representing an edge of the catenary 150.

If both the slope of the line 1 and the slope of the line 2 with reference to the coordinate system are positive values, the processing device 191 determines the line 1 represents an edge of the contact wire 140, and thus determines the first intersection point P1 to be the contact point if the first slope is less than the second slope. On the other hand, the processing device 191 determines the line 2 represents an edge of the contact wire 140, and thus determines the second intersection point P2 to be the contact point if the second slope is less than the first slope.

If both the slope of the line 1 and the slope of the line 2 with reference to the coordinate system are negative values, as shown in FIG. 4(d), the processing device 191 determines the line 1 represents an edge of the contact wire 140, and thus determines the first intersection point P1 to be the contact point if the first slope is greater than the second slope. On the other hand, the processing device 191 determines the line 2 represents an edge of the contact wire 140 and thus determines the second intersection point P2 to be the contact point if the second slope is greater than the first slope.

To cover the above both scenarios, the processing device 191 may determine 325 an absolute value of the first slope, and an absolute value of the second slope.

The processing device 191 then compares the absolute value of the first slope and the absolute value of the second slope and determines 330 that the edge represented by the line 1 is an edge of the contact wire 140 and thus the intersection point P1 is the contact point 131 if the absolute value of the first slope is less than the absolute value of the second slope.

On the other hand, the processing device 191 determines 335 that the edge represented by the line 2 is an edge of the contact wire 140 and thus the intersection point P2 is the contact point 131 if the absolute value of the second slope is less than the absolute value of the first slope.

In the example shown in FIG. 4(d), the edge represented by the line 1 is an edge of the contact wire 140 and the intersection point P1 is determined to be the contact point 131.

Figure 5:
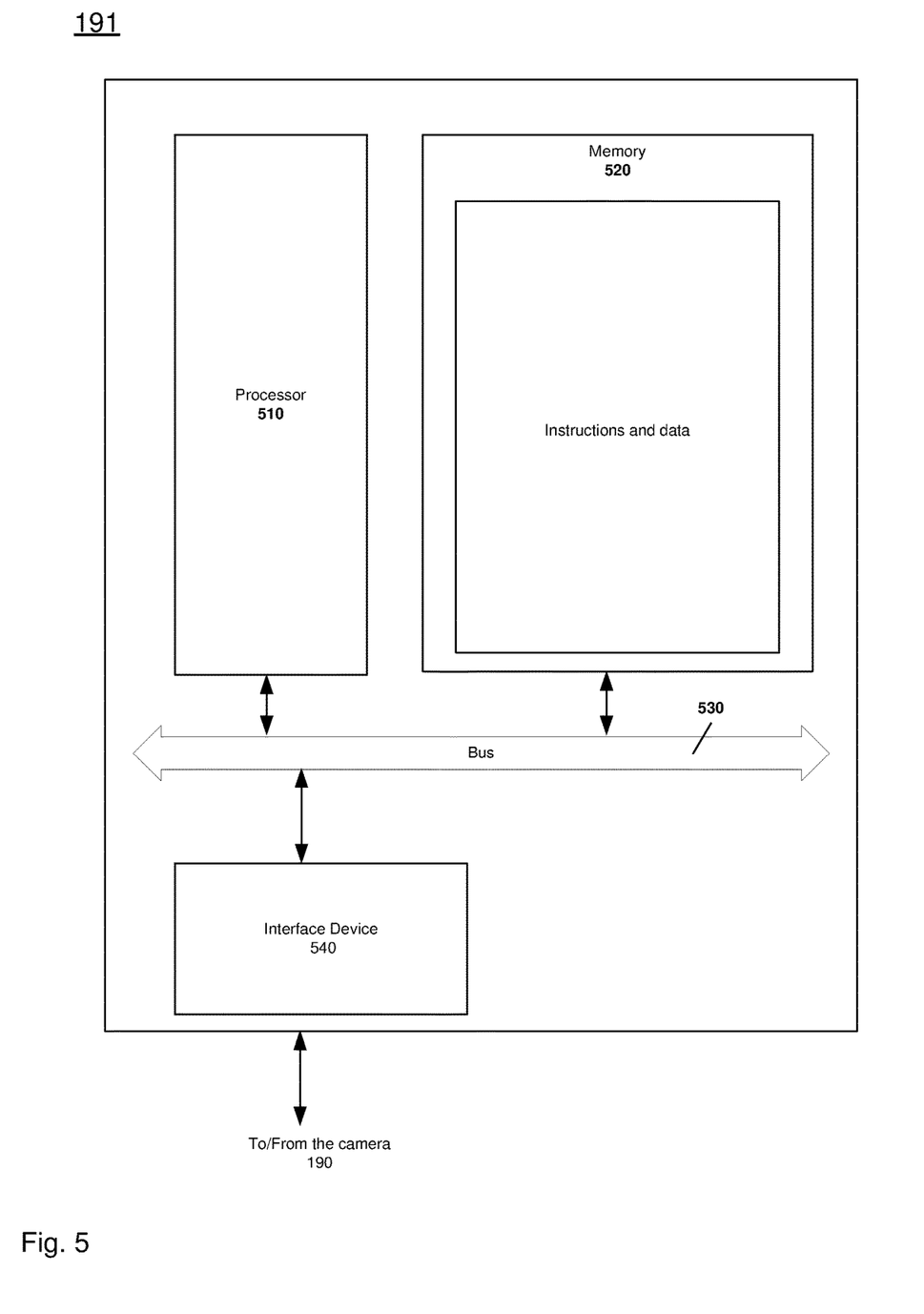
FIG. 5 is an example processing device for identifying a contact point between a pantograph and a power supply line according to the present disclosure.

FIG. 5 illustrates an example processing device 191 according to present disclosure.

The processing device 191 includes a processor 510, a memory 520 and an interface device 540 that communicate with each other via a bus 530. The memory 520 stores instructions and data for the methods and processes described above, and the processor 510 performs the instructions from the memory 520 to implement the methods and processes. It should be noted that although the processing device 191 is shown as an independent entity in FIG. 1, the processing device 191 may also be part of another entity for example the camera 190.

The processor 510 may perform the instructions from the memory 520
- based on edges represented in the image, to determine a first intersection point and a second intersection point that are sufficiently separated, wherein the first intersection point is formed by a first edge and a top edge of the pantograph, and the second intersection point is formed by a second edge and the top edge of the pantograph;
- to determine a first slope associated with the first edge, and a second slope associated with the second edge; and
- to identify one of the first intersection point and the second intersection point as the contact point between the pantograph and the power supply line by comparing the first slope and the second slope.

The processor 510 may also perform other methods and processes described above with reference to the accompanying drawings.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Example carrier waves may take the form of electrical, electromagnetic or optical signals conveying digital data streams along a local network or a publically accessible network such as the Internet.

It should also be understood that, unless specifically stated otherwise as apparent from the following discussion, it is appreciated that throughout the description, discussions utilizing terms such as "obtaining" or "determining" or "sending" or "receiving" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

What is claimed is:

1. A computer-implemented method for determining a contact point between a pantograph and a power supply line represented in an image, the method comprising:
   based on edges represented in the image, determining a first intersection point and a second intersection point that are sufficiently separated, wherein the first intersection point is formed by an intersection of a first edge with a top edge of the pantograph, and the second intersection point is formed by an intersection of a second edge with the top edge of the pantograph;
   determining a first slope associated with the first edge, and a second slope associated with the second edge; and
   identifying one of the first intersection point or the second intersection point as the contact point between the pantograph and the power supply line by:
      determining an absolute value of the first slope and an absolute value of the second slope;
      determining the first intersection point to be the contact point if the absolute value of the first slope is less than the absolute value of the second slope; and
      determining the second intersection point to be the contact point if the absolute value of the second slope is less than the absolute value of the first slope.

2. The computer-implemented method of claim 1, further comprising:
   storing an indication in a memory of the contact point.

3. The computer-implemented method of claim 1, further comprising:
   determining the top edge of the pantograph from the edges represented in the image.

4. The computer-implemented method of claim 1, wherein determining the first intersection point comprises:
   determining a first plurality of intersection points formed by intersections of a first plurality of edges with the top edge of the pantograph, the first plurality of intersection points being sufficiently close to each other; and
   selecting one of the first plurality of intersection points as the first intersection point.

5. The computer-implemented method of claim 4, wherein the first plurality of edges have an associated slope in a slope range.

6. The computer-implemented method of claim 1, wherein identifying one of the first intersection point and the second intersection point as the contact point comprises:
   if both the first slope associated with the first edge and the second slope associated with the second edge are positive values,
   determining the first intersection point to be the contact point if the first slope is less than the second slope; and
   determining the second intersection point to be the contact point if the second slope is less than the first slope.

7. The computer-implemented method of claim 1, wherein identifying one of the first intersection point and the second intersection point as the contact point comprises:
   if both the first slope associated with the first edge and the second slope associated with the second edge are negative values,
   determining the first intersection point to be the contact point if the first slope is greater than the second slope; and
   determining the second intersection point to be the contact point if the second slope is great than the first slope.

8. The computer-implemented method according to claim 4, wherein the first plurality of edges are located in a portion of the image that is above the top edge of the pantograph.

9. The computer-implemented method according to claim 1, wherein determining the first slope associated the first edge comprises:
   determining a first line based on at least part of the first edge to represent the first edge; and
   determining a slope of the first line with reference to a coordinate system as the first slope.

10. The computer-implemented method of claim 1, wherein identifying the contact point indicates a potential source of sparks around the contact point.

11. The computer-implemented method of claim 1, further comprising capturing the image by a camera.

12. A non-transitory computer-readable medium storing instructions, when executed by a processor, causes the processor to perform the method of claim 1.

13. A computer system for determining a contact point between a pantograph and a power supply line represented in an image, the computer system comprising:
   a memory to store instructions;
   a processor configured to perform the instructions from the memory
      based on edges represented in the image, to determine a first intersection point and a second intersection point that are sufficiently separated, wherein the first intersection point is formed by an intersection of a first edge with a top edge of the pantograph, and the second intersection point is formed by an intersection of a second edge with the top edge of the pantograph;
      to determine a first slope associated with the first edge, and a second slope associated with the second edge; and
      to identify one of the first intersection point or the second intersection point as the contact point between the pantograph and the power supply line by:
         determining an absolute value of the first slope and an absolute value of the second slope;
         determining the first intersection point to be the contact point if the absolute value of the first slope is less than the absolute value of the second slope; and
         determining the second intersection point to be the contact point if the absolute value of the second slope is less than the absolute value of the first slope.

14. The computer system of claim 13, wherein the contact point identified indicates a potential source of sparks around the contact point.

15. The computer system of claim 13, further comprising a camera configured to capture the image.

* * * * *